United States Patent
Goodrich, II

(10) Patent No.: US 6,297,620 B1
(45) Date of Patent: Oct. 2, 2001

(54) HIGH EFFICIENCY LOW CURRENT POWER SUPPLY AND BATTERY CHARGE SYSTEM

(75) Inventor: Earl Goodrich, II, E. Lansing, MI (US)

(73) Assignee: Sprint Communications Company, L.P., Kansas City, MO (US)

( * ) Notice: Subject to any disclaimer, the term of this patent is extended or adjusted under 35 U.S.C. 154(b) by 0 days.

(21) Appl. No.: 09/675,585

(22) Filed: Sep. 29, 2000

(51) Int. Cl.[7] .................................................. H02J 7/04
(52) U.S. Cl. ................................. 320/152; 370/546
(58) Field of Search ................................. 320/150, 152, 320/153; 370/546; 379/110.01

(56) References Cited

U.S. PATENT DOCUMENTS

| | | | |
|---|---|---|---|
| H001801 | * 9/1999 | Browning et al. | 379/9 |
| 4,663,580 | * 5/1987 | Wortman . | |
| 5,623,195 | * 4/1997 | Bullock et al. . | |
| 5,881,142 | * 3/1999 | Frankel et al. | 379/167 |
| 5,963,620 | * 10/1999 | Frankel et al. | 379/93.05 |
| 6,075,784 | * 6/2000 | Frankel et al. | 370/356 |
| 6,141,339 | * 10/2000 | Kaplan et al. | 370/352 |

OTHER PUBLICATIONS

Linear Technology Corporation Data Sheet, LTC 1541/LTC 1542, Micropower Op Amp. Comparator and Reference, 1998 pp. 1–2, No month.*

U.S. application No. 09/197,044, Way et al.*

U.S. application No. 09/226,575, Rush et al.*

U.S. application No. 09/650,985, Kaplan et al.*

U.S. application No. 09/650,560, Kaplan et al.*

U.S. application No. 09/653,105, Dale et al.*

* cited by examiner

*Primary Examiner*—Shawn Riley
(74) *Attorney, Agent, or Firm*—Harley R. Ball

(57) ABSTRACT

A cost-effective power supply for providing full time electrical power to a customer premises telecommunications hub is disclosed. The supply includes an AC to DC power converter for converting power from the AC power grid to a DC voltage suitable for operating telecommunications equipment and for maintaining a backup battery at a fully charged float voltage. The converter includes a first rectifier section for generating an unregulated DC voltage. This voltage is switched through the primary of an isolation transformer by a pulse width modulated voltage controller. The output of the transformer is connected to a second rectifier circuit and filter to produce a regulated DC output voltage. The regulated voltage is connected to a voltage correction circuit through a divider including a temperature compensator so that the feedback to the voltage controller causes the regulated output voltage to follow the battery float voltage at all temperatures. The unregulated DC voltage is coupled to the voltage controller current limiting input to protect the power supply at high input voltages.

1 Claim, 3 Drawing Sheets

HIGH EFFICIENCY LOW CURRENT POWER SUPPLY AND BATTERY CHARGE SYSTEM

FIELD OF THE INVENTION

The present invention relates to combination power supplies and battery chargers, and more particularly to power supplies for telecommunications hubs located on business or customer premises which provide power to operate the hub while maintaining backup batteries at float charge level compensated for ambient temperature changes.

BACKGROUND OF THE INVENTION

Traditionally, telephony communications within the United States were handled by the public switched telecommunications network (PSTN). The PSTN can be characterized as a network designed for voice communications, primarily on a circuit-switched basis, with full interconnection among individual networks. The PSTN network is largely analog at the local loop level, digital at the backbone level, and generally provisioned on a wireline, rather than a wireless, basis. The PSTN includes switches that route communications between end users. Circuit switches are the devices that establish connectivity between circuits through an internal switching matrix. Circuit switches set connections between circuits through the establishment of a talk path or transmission path. The connection and the associated bandwidth are provided temporarily, continuously, and exclusively for the duration of the session, or call. While developed to support voice communications, circuit switches can support any form of information transfer (e.g., data and video communications).

In a traditional PSTN environment, circuit switches include central office (CO) exchanges, tandem exchanges, access tandem exchanges, and international gateway facilities. Central offices, also known as exchanges, provide local access services to end users via local loop connections within a relatively small area of geography known as an exchange area. In other words, the CO provides the ability for a subscriber within that neighborhood to connect to another subscriber within that neighborhood. Central offices, also known as end offices, reside at the terminal ends of the network. In other words, COs are the first point of entry into the PSTN and the last point of exit. They are also known as class 5 offices, the lowest class in the switching hierarchy. A class 5 telephone switch communicates with an analog telephone using the analog telephony signals in the well-known analog format. The class 5 telephone switch provides power to the telephone; detects off-hook status of the telephone and provides a dial tone in response; detects dual-tone multi-frequency signals from the caller and initiates a call in the network; plays a ringback tone to the caller when the far-end telephone is ringing; plays a busy tone to the caller when the far-end telephone is busy; provides ring current to the telephone on incoming calls; and provides traditional telephone services such as call waiting, call forwarding, caller ID, etc.

In an effort to increase the amount and speed of information transmitted across networks, the telecommunications industry is shifting toward broadband packet networks which are designed to carry a variety of services such as voice, data, and video. For example, asynchronous transfer mode (ATM) networks have been developed to provide broadband transport and switching capability between local area networks (LANS) and wide area networks (WANs). The Sprint ION network is a broadband network that is capable of delivering a variety of services such as voice, data, and video to an end user at a residential or business location. The Sprint ION network has a wide area IP/ATM or ATM backbone that is connected to a plurality of local loops via multiplexors. Each local loop carries ATM over ADSL (asymmetric digital subscriber line) traffic to a plurality of integrated service hubs (ISHs), which may be at either residential or business locations.

An ISH is a hardware component that links business or residential user devices such as telephones and computers to the broadband, wide area network through a plurality of user interfaces and at least one network interface. A suitable ISH is described in co-pending U.S. patent application Ser. No. 09/226,575 entitled "Multi-Services Communications Device," filed on Jan. 7, 1999 (Sprint docket number 1246), which is incorporated by reference herein in its entirety. The network interface typically is a broadband network interface such as ADSL, T1, or HDSL-2. Examples of user interfaces include telephone interfaces such as plain old telephone system (POTS) ports for connecting telephones, fax machines, modems, and the like to the ISH; computer interfaces such as ethernet ports for connecting computers and local area networks to the ISH; and video ports such as RCA jacks for connecting video players, recorders, monitors, and the like to the ISH.

In providing telephony services over a broadband network, the ISH connects a telephone in the customer's premises to a network element such as a service manager. This connection between the telephone and the network element is typically an ATM connection, which is much different than the traditional analog line to the local switch. ATM connections usually do not support analog telephony signals, such as off-hook, dial tone, and busy signals. Therefore, the ISH must provide many of the telephony functions traditionally provided by the telephone provider central office such as detect off-hook conditions, on-hook connections, and digits as well as provide the telephones with dial tone, ring current, ringback, and busy signals. The terms off-hook and off-hook condition as used herein are generic terms meaning that a user device (whether telephone, facsimile machine, modem, etc.) connected to a telephone line is attempting to access and use the line.

Another example of such a central office function being provided by the ISH is backup power. Traditionally in cases of power grid failure, the central office provides backup power to customers' telephones through use of an industrial-strength, petroleum-fueled backup generator. Since it is not economical to equip each customer with a backup generator, an ISH must be equipped with a back-up power supply, which is typically a battery pack, to maintain power to the system in cases of power grid failure.

The ISH must include a power supply to support the telephony functions (off hook, dial tone, etc.) and to keep the battery pack in charged condition so that it can provide backup power for as long as possible in the event of power grid failure. The power supply of the ISH should be as simple as possible to be cost effective; and yet it is desirable that the power supply be able to operate continuously, use as little power as possible when the power grid fails, and provide high voltage isolation of the user equipment from the power grid.

SUMMARY OF THE INVENTION

A power supply according to the present invention includes an AC to DC power converter for converting AC power from the power grid to DC power for use in the ISH and a sealed lead acid battery connected directly to the DC output of the power converter. The power converter includes a first rectifier section for converting AC power from the power grid into an essentially unregulated first DC voltage. An isolation transformer has a primary coil connected to the first DC voltage and to a pulse width modulated voltage controller. The secondary of the isolation transformer is connected to a second rectifier section for producing a regulated second DC voltage at an output which is connected to the battery. A voltage comparator has an input connected to the second DC voltage by a divider circuit which includes a temperature sensitive device which adjusts the feedback voltage in proportion to battery temperature. The output of the voltage comparator drives the voltage control input of the voltage controller to maintain the regulated DC output voltage at the level needed to maintain the battery at float voltage over the operating temperature range. A current limit input to the voltage controller is provided with an input which is a combination of the primary winding current level and the first DC voltage level, to maintain maximum power availability level without overheating the power supply.

DETAILED DESCRIPTION OF THE INVENTION

Figure 1:
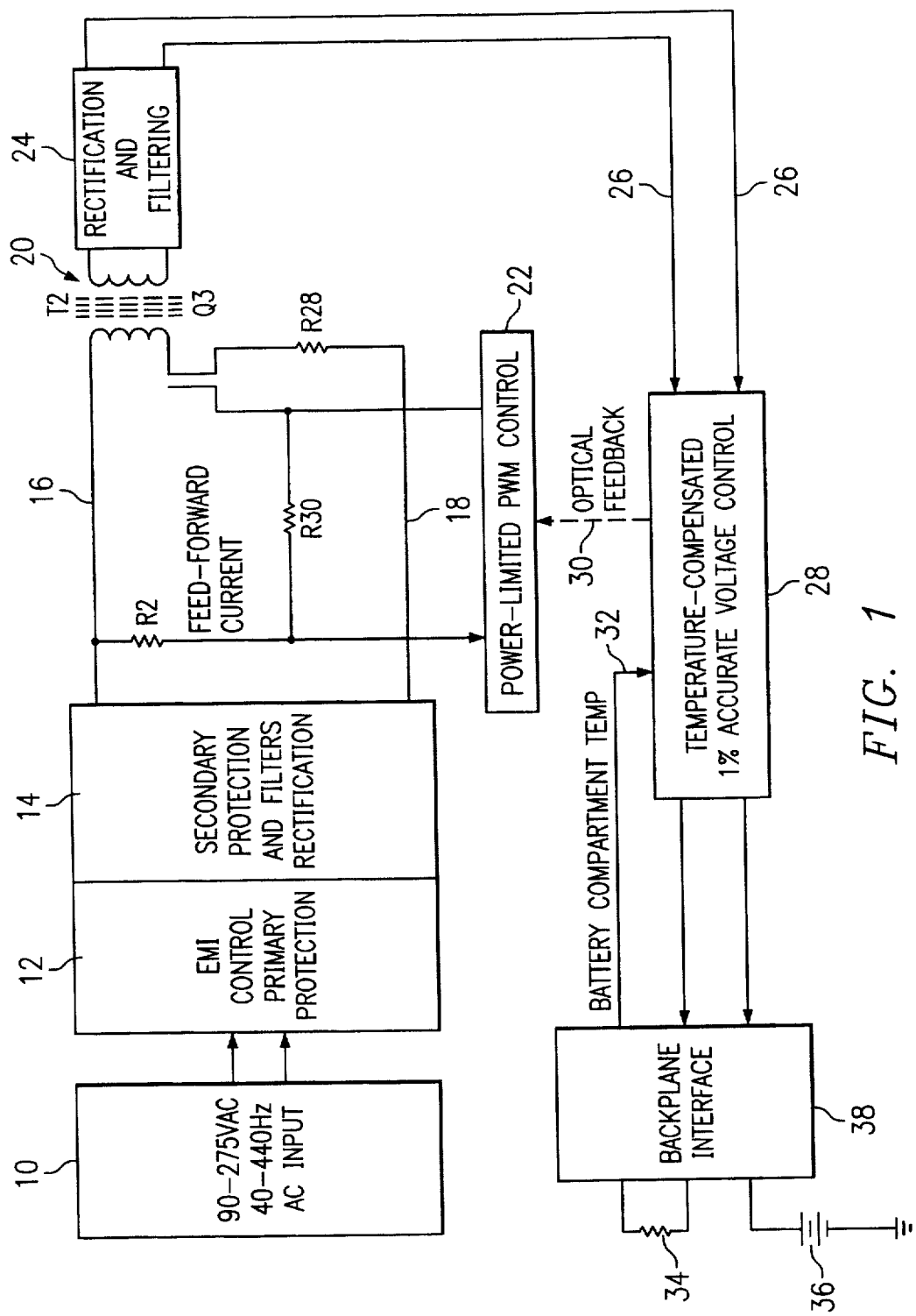
FIG. 1 is a block diagram of a power supply according to the present invention.

With reference to FIG. 1, there is provided a block diagram illustrating the primary elements of a power supply according to the present invention. Block 10 represents a source of AC power, which for many user applications will be 117 volt 60 Hertz AC power from a residential power grid which is standard in the United States. The preferred embodiment, however, is adapted for receiving input voltages from 90 to 275 volts and at frequencies from 40 to 440 Hertz, to accommodate power grids in essentially all countries. The input power passes through a primary protection and EMI control section 12 to reduce power spikes and noise. The power then passes through block 14 where additional protection and rectification is provided. A first DC voltage is provided between output lines 16 and 18. This first DC voltage is not closely regulated and will vary depending on input voltage. An high frequency isolation transformer 20 is connected to the outputs 16 and 18 and to a pulse width modulated voltage controller 22. The secondary of transformer 20 is connected to a rectification and filtering section 24 which provides a closely regulated DC voltage across its outputs 26. The regulated DC voltage is fed back to a voltage comparator 28. Comparator 28 provides a voltage control signal through optical feedback 30 to voltage controller 22.

Voltage controller 28 also receives a temperature compensation input on line 32. This signal is generated by a thermistor 34 located near battery 36. Battery 36 is connected through backplane interface 38 to the regulated voltage on lines 26. Thermistor 34 is likewise connected through the backplane 38 to the control circuitry. Backplane 38 is a printed circuit board with a number of sockets for receiving and interconnecting the various printed circuit boards which comprise a telecommunications hub. Every board connected to the backplane requires electrical power. The power supply of the present invention provides this power from the input 10 so long as the power grid is working. If the power grid fails, the battery 36 is hard wired to the backplane and continues to provide the needed power to allow continued operation of the telecommunications hub.

Prior art systems such as that shown in U.S. Pat. No. 4,663,580 typically provide switches and necessary control circuitry to isolate a back up battery from a system requiring power until the power grid actually fails. Other systems such as that shown in U.S. Pat. No. 5,623,195 provide additional circuitry to avoid thermal runaway or overcharging of batteries which have been discharged. The present invention provides very simple cost effective circuitry in place of the more complicated prior art systems.

Under normal conditions, that is, when the power grid is working, it is important to keep the battery 36 fully charged, but not overcharged. This requires a closely regulated voltage which is compensated for battery temperature. The float, or fully charged voltage of lead acid batteries is known to vary with temperature. As temperature increases, the battery voltage decreases. If a constant supply voltage is applied to a battery, the charging current will increase as temperature rises. In a sealed lead acid battery, it is important to prevent overcharging because of its limited capacity to recombine oxygen and hydrogen which are produced by excess current. In the present invention, the thermistor 34 is placed near the battery 36. Its resistance changes with temperature and provides a feedback signal to adjust the regulated output voltage so that it matches the float voltage of the battery 36. As explained below, by proper choice of components the voltage control can be accurate within one percent.

If the "unusual" condition of power grid failure occurs, then power is supplied by the battery 36. The battery will of course discharge during the power outage. Upon restoration of power from the power grid, the battery 36 will begin recharging. Depending on the state of discharge, the battery could draw significant currents, especially if the input source 10 is a high voltage source. To prevent overstressing components in this situation, the present invention provides a simple current limiting protection arrangement. In FIG. 1, resistor R28 is an in-line current sensing resistor used to provide a current limiting signal to voltage controller 22. An additional resistor R2 is connected from the positive unregulated DC voltage line 16 to the current sense input. As the voltage on line 16 increases, the signal from resistor R2 limits current through the primary of transformer 20 to protect components from overheating and possible failure.

Figure 2A:
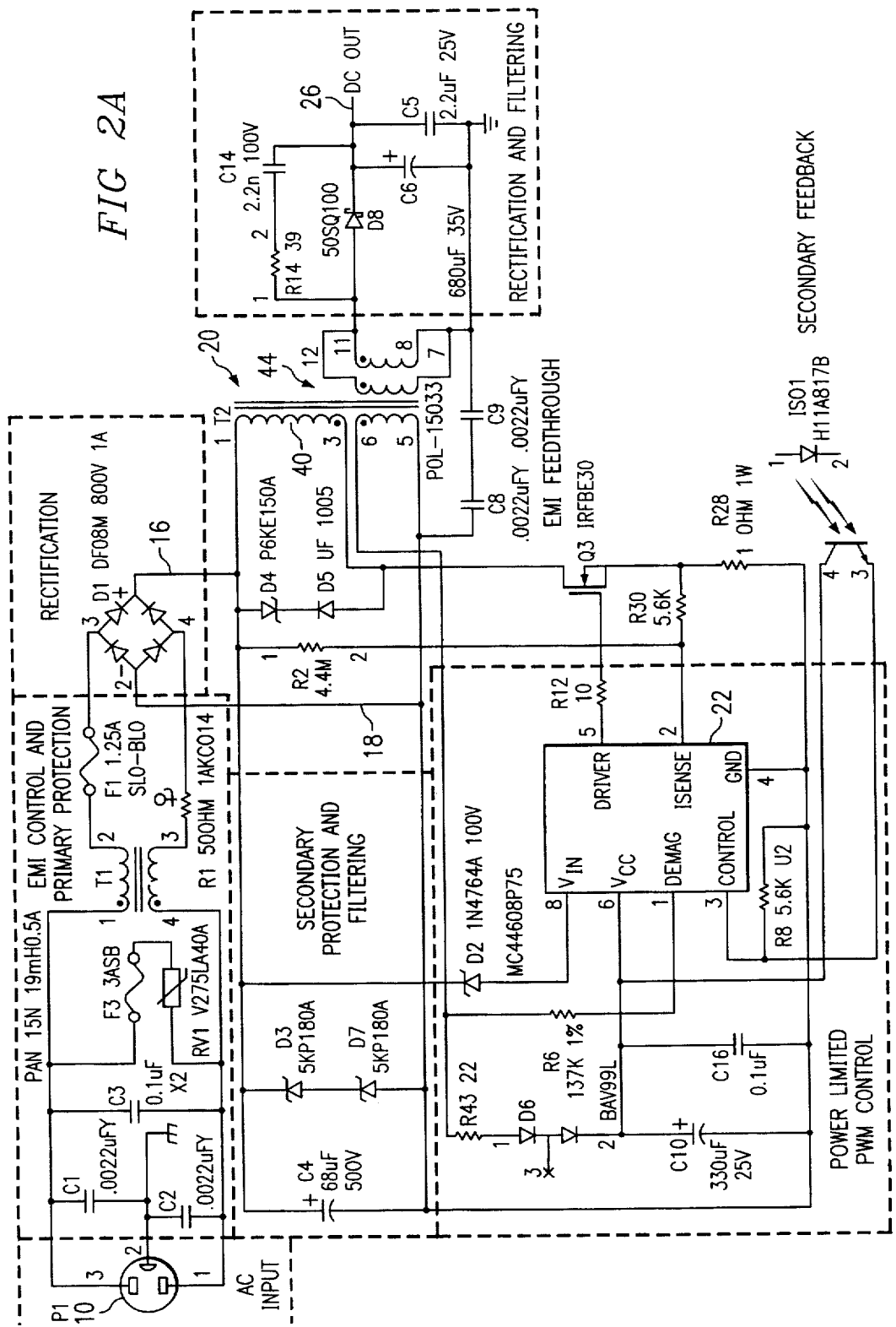
FIGS. 2A and 2B together provide an electrical schematic diagram of the circuitry of an embodiment of the present invention.
Figure 2B:
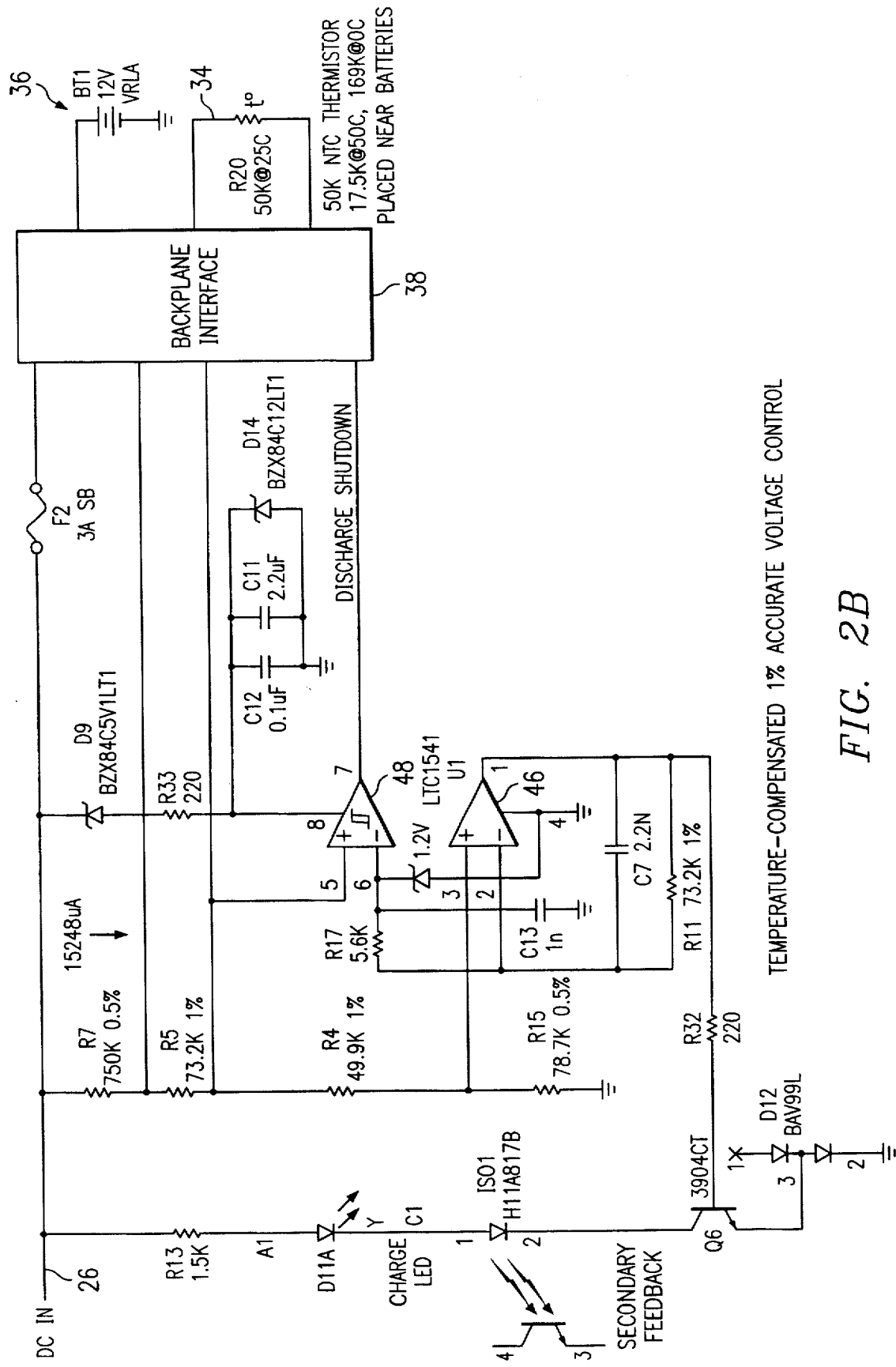

A detailed electrical schematic diagram of an embodiment of the present invention is provided in FIGS. 2A and 2B. Components which are also individually shown in FIG. 1 are identified with the same numbers in FIGS. 2A and 2B.

In FIG. 2A, the AC power grid input 10 is illustrated with the standard US power plug configuration. The primary protection (box 12 of FIG. 1) is provided by capacitors C1, C2 and C3. Secondary protection and rectification (box 14, FIG. 1) is provided by transformer T1, fuse F1, thermistor R1 and full wave diode bridge D1. The first DC voltage appears across lines 16 and 18 and is smoothed by capacitor C4 and peak limited by zener diodes D3 and D7.

Primary winding 40 of isolation transformer 20 is connected between power lines 16 and 18 in series with power transistor Q3 and current sensing resistor R28. A secondary winding 42 together with diodes D6 and capacitors C10 and C16 provide operating voltage to pulse width modulated voltage controller 22. The driver output of controller 22 is connected through resistor R12 to transistor Q3. Secondary windings 44 of transformer 20 are connected to diode D8 and capacitors C6 and C5 to provide rectification and filtering (block 24, FIG. 1) for the regulated output DC power on line 26.

FIG. 2B illustrates the voltage control section (block 28, FIG. 1) and other parts of the power supply. Line 26 connects the regulated DC power to the backplane interface 38, and through it to battery 36 and all other systems which are operated by this power. The thermistor 34 is connected through the backplane interface to a resistor divider string comprising resistors R7, R5, R4, and R15 connected in series between line 26 and ground. Thermistor 34 is connected in parallel with resistor R5. The voltage at the junction of resistors R4 and R15 is applied to the positive input of op-amp, operational amplifier, 46. This amplifier compares the input voltage to an internal reference and provides a control signal through transistor Q6 and optical isolator ISO1 to the control input of voltage controller 22. The resistance of thermistor 34 changes with the temperature of battery 36, which in turn changes the feedback signal to op-amp 46, which causes the controller 22 to adjust the output voltage on line 26 to match the float voltage of battery 36. With the components specified in FIG. 2B, the output voltage is compensated at the rate of minus 3 millivolts per degree centigrade per cell. For the 12 volt battery of this embodiment, the compensation is therefore minus 18 millivolts per degree centigrade. The parallel combination of the fixed resistor R5 causes some desirable deviation from this compensation rate at the high end.

In this embodiment, op-amp 46 is a part number LTC1541 manufactured by Linear Technology Corporation. Use of this part, or an equivalent part, is important for two reasons. It contains a voltage reference with a 0.4% accuracy. When this is combined with the resistor string R7, R5, R4 and R15 having a total accuracy of 0.5%, the voltage control is accurate within 1%. With this level of accuracy, the battery 36 can be permanently connected to the backplane interface and kept at full charge without overcharging which would shorten its lifetime and reduce its capacity. The LTC 1541 device uses very little power, requiring only about 5 microamps of current. The resistor string specified in FIG. 2B uses about 15 microamps. At these low power levels, there is no need to disconnect the voltage control circuitry when the power grid fails, even if the following system circuits are switched off, such as for storage.

As discussed above, the present invention also includes a current limiting circuit to protect the power supply as shown in FIG. 2A. Resistor R28 is connected in series with power transistor Q3 to sense the current levels in primary winding 40 of transformer 20. The voltage across resistor R28 is coupled to the current sensing input of voltage controller 22 through resistor R30. In the present invention a second input is provided to the current sense input. Resistor R2 is connected from the current sense input to line 16. As the voltage on line 16 increases, the peak current levels in primary 40 of transformer 20 are decreased. This prevents damage which might otherwise occur at high input voltages, while allowing use of full supply power capacity over the full operational range.

In FIG. 2B there is also illustrated a low voltage shutdown circuit. It includes a voltage comparator 48 which is physically part of the same LTC1541 device which contains op-amp 46. Comparator 48 has a positive input connected to the junction of resistors R4 and R5 and a negative input connected to a reference voltage. With the values shown, comparator 48 will generate a discharge shutdown signal when the battery voltage drops to about nine volts. At this level, at least one cell of battery 36 is fully discharged. Further discharging would probably cause permanent damage to the battery. The discharge shutdown signal is coupled by the backplane interface to the other devices plugged into the backplane. In response to the shutdown signal the other devices should go into an inactive state and essentially stop drawing power from the battery.

While the present invention has been illustrated and described with reference to specific circuits and methods of operation, it is clear that various modifications thereof and substitution of parts may be made within the scope of the invention as defined by the appended claims.

What is claimed is:

1. A power supply for a customer premises telecommunications hub comprising:

an AC to DC power converter having an input for receiving AC power from a commercial power grid and an output connected to a DC power bus of the telecommunications hub and including a voltage controller having a voltage control input, a battery connected to the DC power bus, a temperature sensing device located near the battery, a low power voltage comparator having an input connected to the DC power bus through a voltage divider including the temperature sensing device and having an output coupled to the voltage controller voltage control input.

* * * * *